United States Patent
Kim

(10) Patent No.: US 8,824,874 B2
(45) Date of Patent: *Sep. 2, 2014

(54) APPARATUS AND METHOD FOR CONVERTING OPERATION MODE IN IMAGE DISPLAY COMPOUND DEVICE

(75) Inventor: Eun-sup Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 136 days.

This patent is subject to a terminal disclaimer.

(21) Appl. No.: 12/805,891

(22) Filed: Aug. 23, 2010

(65) Prior Publication Data

US 2010/0321569 A1    Dec. 23, 2010

Related U.S. Application Data

(63) Continuation of application No. 10/742,858, filed on Dec. 23, 2003, now Pat. No. 7,801,408.

(30) Foreign Application Priority Data

Dec. 23, 2002 (KR) .................................. 2002-82382

(51) Int. Cl.
*H04N 5/77* (2006.01)

(52) U.S. Cl.
USPC ...... 386/359; 348/468; 348/705; 348/E7.001; 381/120

(58) Field of Classification Search
USPC .................. 386/359; 348/468, E07.001, 705; 381/120
See application file for complete search history.

(56) References Cited

U.S. PATENT DOCUMENTS

| | | | |
|---|---|---|---|
| 5,978,923 A | 11/1999 | Kou | 713/323 |
| 6,449,209 B1 | 9/2002 | Lee | 365/230.03 |
| 6,591,314 B1 * | 7/2003 | Colbath | 710/36 |
| 6,993,722 B1 | 1/2006 | Greer et al. | 715/739 |
| 7,143,328 B1 * | 11/2006 | Altmann | 714/746 |
| 7,801,408 B2 * | 9/2010 | Kim | 348/725 |
| 2001/0018749 A1 | 8/2001 | Noda et al. | 713/310 |
| 2001/0052946 A1 | 12/2001 | Sato | 348/706 |
| 2001/0056509 A1 | 12/2001 | Iwata | 710/20 |
| 2002/0186769 A1 * | 12/2002 | O'Brien | 375/240.12 |
| 2002/0191761 A1 | 12/2002 | Takayama et al. | 379/110.01 |
| 2003/0038823 A1 * | 2/2003 | Pasqualini et al. | 345/660 |
| 2004/0252886 A1 | 12/2004 | Pan et al. | 382/173 |

FOREIGN PATENT DOCUMENTS

JP    07-154716    6/1995
KR    1998-047360    9/1998

OTHER PUBLICATIONS

U.S. Appl. No. 11/742,858, filed Dec. 23, 2003, Eun-Sup Kim, Samsung Electronics Co., Ltd.
U.S. Office Action mailed Jun. 13, 2008 in U.S. Appl. No. 10/742,858.

(Continued)

*Primary Examiner* — Thai Tran
*Assistant Examiner* — Girumsew Wendmagegn
(74) *Attorney, Agent, or Firm* — Staas & Halsey LLP

(57) ABSTRACT

An operation-mode conversion apparatus for an image display compound device includes a power-state detector which detects a power state of the compound device, an operation-mode determination unit which determines a present operation mode of the compound device, and an operation-mode controller which converts the operation mode of the compound device based on the power state, the present operation mode, and whether one of an optical storage medium and a movable memory is detected by the compound device, in response to a user input signal, regardless of the preset operation mode.

30 Claims, 3 Drawing Sheets

(56) References Cited

OTHER PUBLICATIONS

U.S. Final Office Action mailed Dec. 24, 2008 in U.S. Appl. No. 10/742,858.
U.S. Office Action mailed Apr. 15, 2009 in U.S. Appl. No. 10/742,858.
U.S. Office Action mailed Dec. 30, 2009 in U.S. Appl. No. 10/742,858.
U.S. Notice of Allowance mailed May 14, 2010 in U.S. Appl. No. 10/742,858.
U.S. Appl. No. 10/742,858, filed Dec. 23, 2003, Eun-Sup Kim, Samsung Electronics Co., Ltd.

* cited by examiner

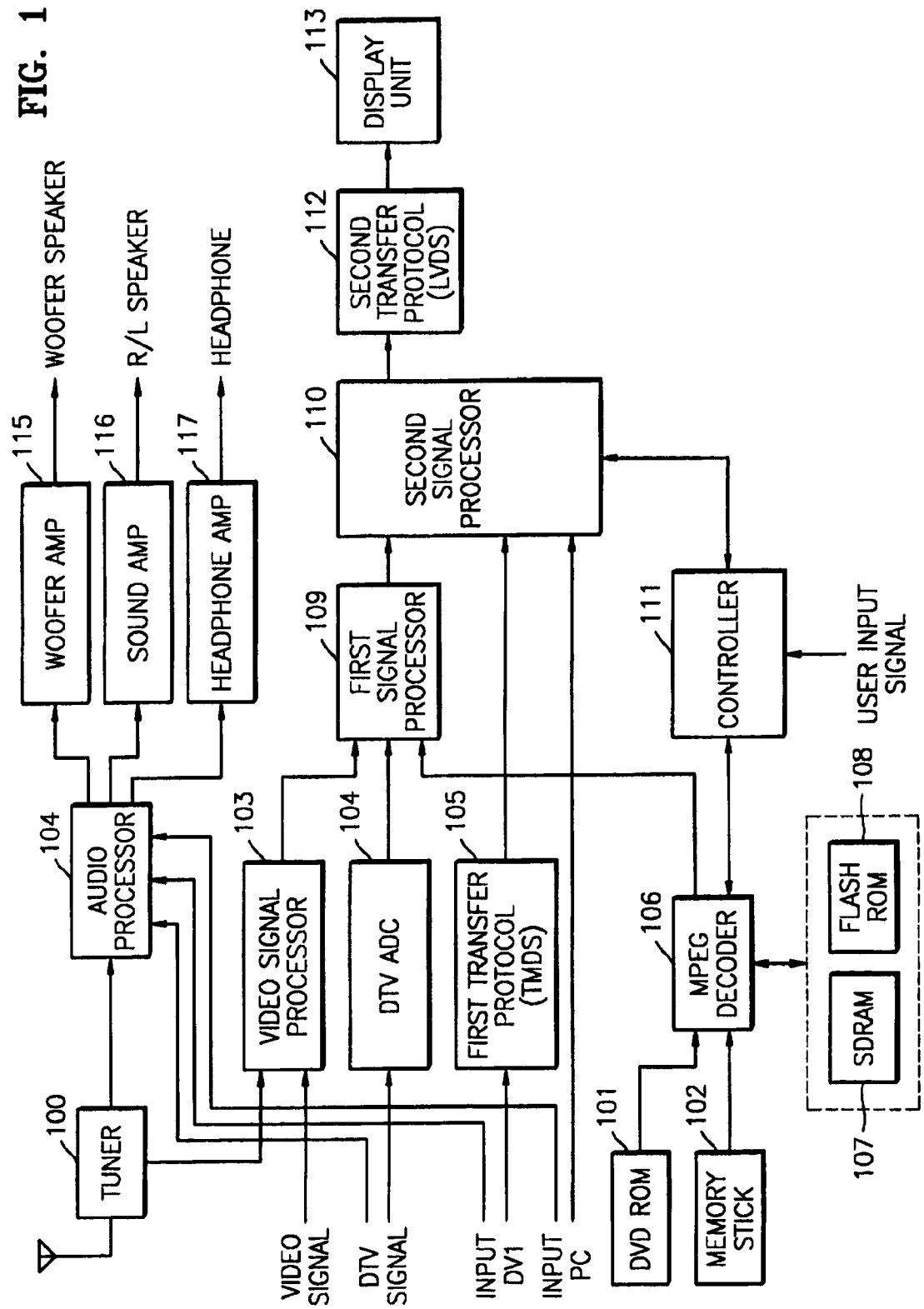

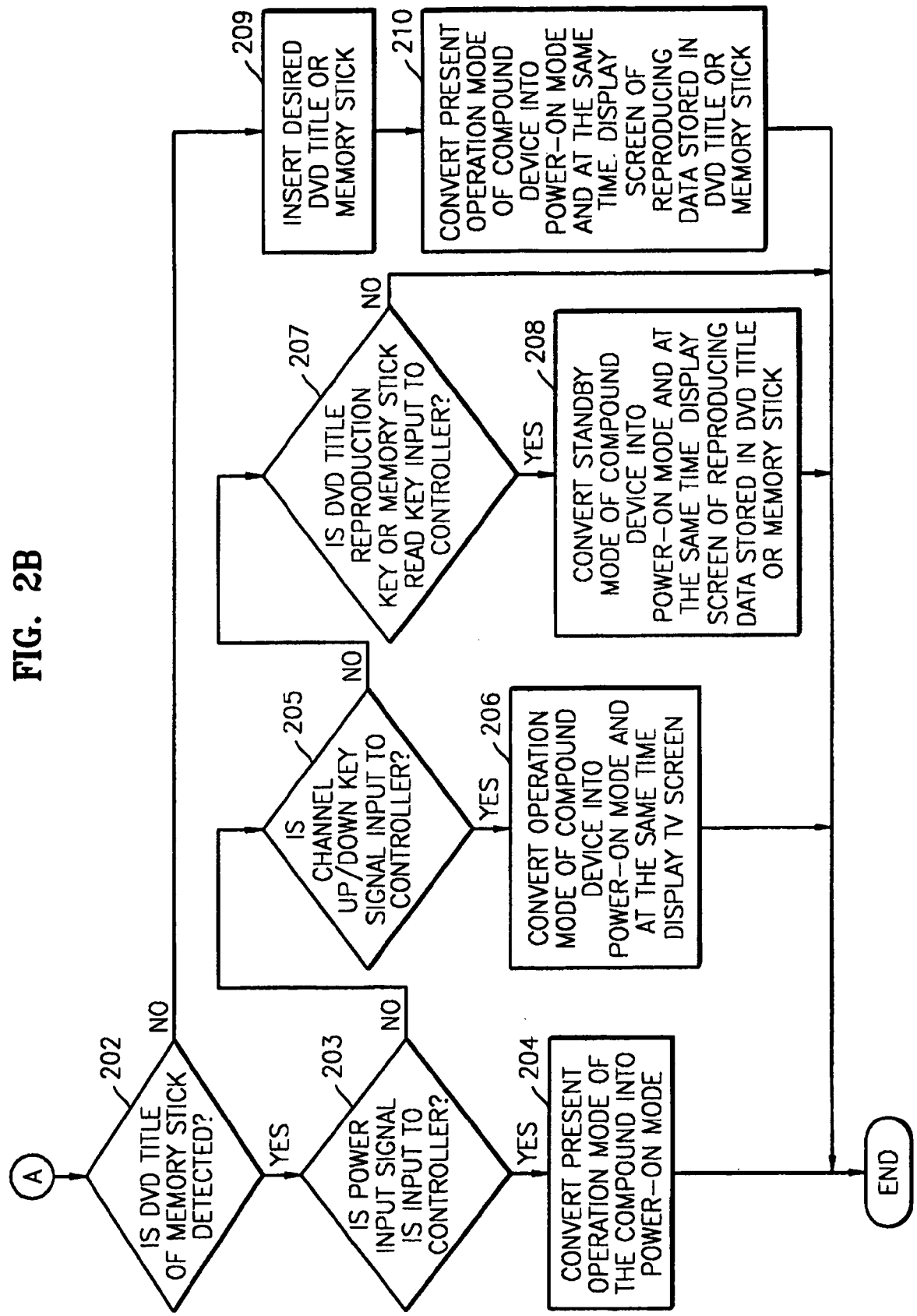

APPARATUS AND METHOD FOR CONVERTING OPERATION MODE IN IMAGE DISPLAY COMPOUND DEVICE

CROSS-REFERENCE TO RELATED APPLICATIONS

This application is a continuation of application Ser. No. 10/742,858 filed on Dec. 23, 2003 U.S. Pat. No. 7,801,408, which claims the priority of Korean Patent Application No. 2002-82382, filed on Dec. 23, 2002, in the Korean Intellectual Property Office, the disclosure of which is incorporated herein by reference.

BACKGROUND OF THE INVENTION

1. Field of the Invention

The present invention relates to an apparatus and method for operating an image display apparatus, and more particularly, to an operation-mode conversion apparatus and method of operating a multi-function image display compound device, using a minimum of user interfaces.

2. Description of the Related Art

In the past, only single-function electronic appliances were manufactured. For instance, a television (TV) had a TV receiving function and a digital versatile disc (DVD) player had a function of reproducing DVD data. That is, electronic appliances with TV and DVD player functions were not designed.

However, compound devices in which a TV function and an auxiliary image output device function are united together have recently been developed, the auxiliary image output device including a video cassette recorder (VCR), a DVD player, or a personal computer (PC). In general, each of the compound devices includes a TV processor that processes TV signals, and an auxiliary function processor that controls the operation of the auxiliary image output device. The auxiliary function processor receives a control command from the TV processor and performs the control command.

U.S. Pat. No. 6,339,455 discloses a digital videodisc vehicle television that is an image display compound device.

However, most of multi-function image display compound devices have internal circuits that are physically integrated but are not entirely integrated while maintaining a minimum of circuit interface functions. This makes the user interface complicated, causes inconvenience because a process of selecting a desired mode is complicated, and results in exposure of function keys outside the compound device. For instance, to operate a DVD player function of a compound device that is powered off, the compound device is powered on and a mode conversion key is input several times to select a DVD mode, e.g., a terrestrial TV mode→a video mode→a digital TV (DTV) mode→a DVD mode. Next, a DVD title is inserted into the compound device and a "Play" key is input. Then, the DVD player function is executed. Accordingly, user interface functions are so complicated that a user may have difficulty using the compound device, and the installation of many function keys outside the compound device detracts from the aesthetics of the compound device.

SUMMARY OF THE INVENTION

The present invention provides an operation-mode conversion apparatus that enables easy operation of a multi-function image display appliance, using a minimum of user interfaces.

The present invention also provides an operation-mode conversion method that enables easy operation of a multi-function image display appliance, using a minimum of user interfaces.

Additional and/or other aspects and advantages of the invention will be set forth in part in the description which follows and, in part, will be obvious from the description, or may be learned by practice of the invention.

According to an aspect of the present invention, there is provided an operation-mode conversion apparatus including: a power-state detector which detects a power state of the compound device; an operation-mode determination unit which determines a present operation mode of the compound device; and an operation-mode controller which converts the operation mode of the compound device based on the power state, the present operation mode, and whether one of an optical storage medium and a movable memory is detected by the compound device, in response to a user input signal, regardless of the preset operation mode.

The operation-mode controller may change the operation mode to one of an optical storage medium mode and a movable memory reproduction mode when the power state of the compound device indicates that the compound device is in a standby mode, one of the optical storage medium and the movable memory is present in the compound device, and a reproduction key is input to the operation-mode controller.

The operation-mode controller may change the operation mode to a TV broadcast mode when a channel conversion key is input, even when the power state indicates that the compound device is in the standby mode and one of the optical storage medium and the movable memory is detected by the compound device.

The operation-mode controller may change the operation mode to one of an optical storage medium mode and movable memory reproduction mode when the power state indicates that the compound device is in a standby mode and one of the optical storage medium and the movable memory is inserted into the compound device.

The operation-mode controller may change the operation mode to the TV broadcast mode regardless of the present operation mode of the operation-mode controller when the power state indicates that the compound device is powered on and operating in a predetermined operation mode, and the channel conversion key signal is input to the operation-mode controller.

The operation-mode controller may change the operation mode to one of the optical storage medium mode and movable memory reproduction mode regardless of the present operation mode of the compound device, when the power state indicates that the compound device is powered on and operating in a predetermined operation mode and the reproduction key is input to the operation-mode controller.

According to another aspect of the present invention, there is provided an operation-mode conversion method including: checking a power state of the compound device; determining a present operation mode of the compound device; and converting the operation mode of the compound device based on the power state, the present operation mode, and when one of an optical storage medium and a movable memory is detected by the compound device, in response to a user input signal, regardless of the present operation mode.

The converting may comprise converting the present operation mode of the compound device into one of an optical storage medium and a movable memory reproduction mode when the power state of the compound device is in a standby mode, one of the optical storage medium and a movable memory is detected from the compound device, and a reproduction key signal is input to the operation-mode controller.

The converting may comprise converting the present operation of the compound device into a TV broadcast mode when a channel conversion key signal is input to the operation-mode controller, even if the power state indicates that the compound device is in a standby mode and one of the optical storage medium or the movable memory is detected from the compound device.

The converting may comprise converting the present operation of the compound device into one of an optical storage medium mode and movable memory reproduction mode when the power state indicates that the compound device is in a standby mode and one of the optical storage medium and the movable memory is inserted into the compound device.

The converting may comprise converting the present operation mode of the compound device into the TV broadcast mode regardless of the present operation mode, when the compound device is powered on and operating in a predetermined operation mode and the channel conversion key is input to the operation-mode controller.

The converting may comprise converting the present operation mode of the compound device into one of the optical storage medium mode and movable memory reproduction mode regardless of the present operation mode, when the compound device is powered on and operates in a predetermined mode and the reproduction key is input to the operation-mode controller.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1 is a block diagram of an operation-mode conversion apparatus included in an image display compound device, according to an embodiment of the present invention; and FIGS. 2A and 2B are flowcharts illustrating an operation-mode conversion method performed in an image display compound device, according to an embodiment of the present invention.

DETAILED DESCRIPTION OF EMBODIMENT

Figure 2A:
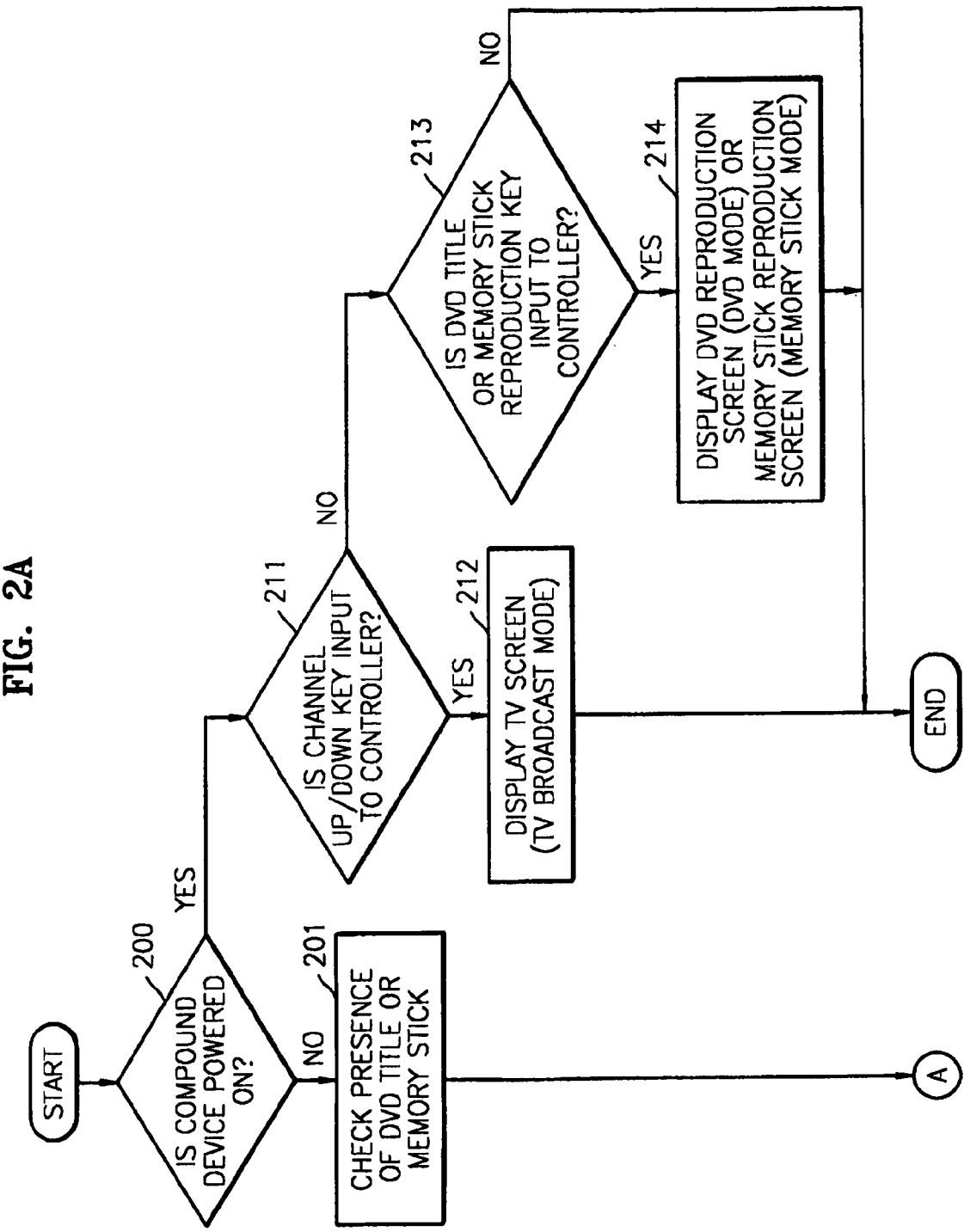

Reference will now be made in detail to an embodiment of the present invention, an example of which is illustrated in the accompanying drawings, wherein like reference numerals refer to the like elements throughout. The embodiment is described below to explain the present invention by referring to the figures.

FIG. 1 is a block diagram illustrating the structure of an operation-mode conversion apparatus included in an image display compound device, according to an embodiment of the present invention. The operation-mode conversion apparatus includes a tuner 100, digital versatile disc read-only memory (DVD ROM) 101, a memory stick 102, a video signal processor 103, a digital television analog-to-digital converter (DTV ADC) 104, a first transfer protocol 105, a motion picture experts group (MPEG) decoder 106, synchronous dynamic random access memory (SDRAM) 107, flash ROM 108, a first signal processor 109, a second signal processor 110, a controller 111, a second transfer protocol 112, a display unit 113, an audio processor 114, a Woofer amplifier 115, a sound amplifier 116, and a headphone amplifier 117.

FIGS. 2A and 2B are flowcharts illustrating an operation-mode conversion method performed in an image display compound device, according to this embodiment of the present invention. The operation-mode conversion method includes determining whether the compound device is powered on or off (action 200), checking the presence of a DVD title or a memory stick (action 201), determining whether the DVD title or the memory stick is detected in action 201 (action 202), determining whether a power input signal is received (action 203), converting a mode of the compound device into a power-on mode (action 204), determining whether a channel up/down key signal related to the compound device is received (action 205), displaying a TV screen at the same time when the compound device is powered on (action 206), determining whether a DVD reproduction key signal or a memory stick read key signal is received (action 207), displaying data reproduced from the DVD title or a memory stick at the same time when the compound device is powered on (action 208), inserting a desired DVD title or a desired memory stick into the compound device (action 209), displaying data reproduced from a DVD stick or a memory stick reproduction screen at the same time when the compound device is powered on (action 210), determining whether a channel up/down key signal related to the compound device is received (action 211), displaying a TV broadcast screen (action 212), determining whether a DVD title reproduction key signal or a memory stick reproduction key signal is received (action 213), and displaying a DVD reproduction screen or a memory stick reproduction screen (action 214).

Hereinafter, the present embodiment of the present invention is described in detail with reference to FIGS. 1 and 2.

First, an operation-mode conversion apparatus will be described.

An image display compound device according to the present embodiment of the present invention displays or reproduces various external image signals. The various image signals include a TV broadcast signal received from the tuner 100; a video signal transmitted from a video cassette recorder (VCR) (not shown); a DTV signal; a personal computer (PC) signal transmitted from a PC (not shown); a digital visual interface (DVI) signal that is transmitted from a PC main body and displayed on the compound device, when the compound device is connected to a PC and used as a monitor; a signal output from the DVD ROM 101; and a signal output from the memory stick 102.

The video signal processor 103 switches and decodes a TV broadcast signal received from the tuner 100, or a video signal.

The DTV analog data converter (ADC) 104 converts a DTV broadcast signal, which is an analog signal, into a digital signal.

The first transfer protocol implementer 105 transmits a DVI signal, which is received using a transition minimized differential signal (TMDS) method, to the second signal processor 110.

The MPEG decoder 106 decodes compressed signals stored in the DVD ROM 101 and the memory stick 102, which is movable memory, according to the MPEG standards. The SDRAM 107 stores the MPEG decoded signals, which are stored in the DVD ROM 101 and the memory stick 102. The flash ROM 108 stores sources for MPEG decoding.

The first signal processor 109 removes noise in a decoded video signal and a DTV signal transmitted from the video signal processor 103, the DTV ADC 104, and the MPEG decoder 106, and signals from the DVD ROM 101 and the memory stick 102, and optimizes the color of the video signal. Also, the first signal processor 109 deinterlaces an interlaced broadcast signal.

The second signal processor 110 scales the video signal output from the first signal processor 109 so that this signal is outputtable output to the display unit 113. Under a control of the controller 111, the second signal processor 110 processes a caption signal and a picture-in-picture (PIP) signal and displays the processed signals.

The second transfer protocol 112 implementer transmits the scaled video signal output from the second signal processor 110 to the display unit 113, using low-voltage differential signal (LVDS) transfer method.

The audio processor 114 extracts only audio signals from the TV broadcast signal received via the tuner 100, a video signal transmitted from a VCR (not shown), the DTV signal, a PC signal transmitted from a PC (not shown), a DVI signal, for a monitor, that is transmitted from a PC main body when the compound device is connected to the PC main body, the signal output from the DVD ROM 101, and the signal output from the memory stick 102. The audio processor 114 processes the extracted audio signals into audible signals.

The woofer amplifier 115, the sound amplifier 116, and the headphone amplifier 117 amplify an audio-processed woofer signal, a sound signal, and a headphone signal and outputs these signals to a woofer speaker, a sound speaker, and a headphone, respectively.

The controller 111 controls the overall operations of the compound device. The controller 111, which controls operation-mode conversion, includes a power-state detector (not shown) that checks whether the compound device is powered on or off, and an operation-mode determination unit (not shown) that determines an operation mode of the compound device. Also, the controller 111 controls operation-mode conversion in response to a user input signal, in consideration of the power state and present operation mode of the compound device, whether the DVD ROM 101 or the memory stick 102 is detected from the compound device, regardless of the present operation of the compound device.

When the compound device is in a standby mode, the presence of the DVD ROM 101 or the memory stick 102 is detected from the compound device, and a reproduction key signal (or user input signal) for reproducing the DVD ROM 101 or the memory stick 102 is input to the controller 111, the controller 111 converts an operation mode of the compound device into a mode of reproducing data stored in the DVD ROM 101 or the memory stick 102, and controls respective related blocks, so as to output a screen related to reproduction of the data stored in the DVD ROM 101 or the memory stick 102 to the display unit 113 and a speaker (not shown).

When the power state of the compound device indicates that the compound device is in a standby mode and the presence of the DVD-ROM 101 or the memory stick 102 is detected from the compound device and a channel up/down key (or a user input signal) is input to the controller 111, the controller 111 converts an operation mode of the compound device into a TV broadcast mode and controls respective related blocks, so as to a TV broadcast screen to the display unit 113 and the speaker.

When the power state of the compound device indicates that the compound device is in a standby mode and the DVD ROM 101 or the memory stick 102 is inserted into the compound device, the controller 111 converts an operation mode of the compound device into a reproduction mode of reproducing the data stored in the DVD ROM 101 or the memory stick 102 and controls respective related blocks, so as to output a screen of reproducing the data stored in the DVD ROM 101 or the memory stick 102 to the display unit 113 and the speaker.

When the power state of the compound device indicates that the compound device is powered on and operates in a predetermined mode, e.g., a TV broadcast screen is displayed, a video signal is displayed, or a PC signal is displayed, and the channel up/down key signal (or user input signal) is input to the controller 111, the controller 111 converts an operation mode of the compound device into a TV broadcast mode, regardless of the present operation mode, and controls respective related blocks, so as to output the TV broadcast screen to the display unit 113 and the speaker.

When the power state of the compound device indicates that the compound device is powered on and operates in a predetermined mode, e.g., the TV broadcast screen is displayed, a video signal is displayed, or a PC signal is displayed, and a reproduction key signal (or user input signal) is input to the controller 111, the controller 111 converts an operation mode of the compound device into a reproduction mode of reproducing the data stored in the DVD ROM 101 or the memory stick 102, regardless of the present operation mode, and controls respective related blocks, so as to output a screen of reproducing the data stored in the DVD ROM 101 or the memory stick 102 to the display unit 113 and the speaker.

An operation-mode conversion method performed in an image display compound device will be described.

The image display compound device displays or reproduces various external image signals, such as an external TV broadcast signal, an external video signal, an external DTV signal, a PC signal, a DVI signal, a signal output from the DVD ROM 101, and a signal output from the memory stick 102.

First, the controller 111 checks whether the compound device is powered on in action 200.

Next, if the compound device is powered off, i.e., it is in a standby mode, the controller 111 checks whether the DVD ROM 101, e.g., a DVD title, or the memory stick 102 is present in the compound device in action 201.

It is determined in action 202 that the DVD title of the memory stick 102 is detected in action 201. In action 203, whether a power input signal (or user input signal) is input to the controller 111 is checked. In action 204, the controller 111 converts the standby mode of the compound into a power-on mode.

If the DVD title or the memory stick 102 is detected, whether a channel up/down key signal is input to the controller 111 is checked in action 205. In action 206, the operation mode of the compound device is converted into a TV broadcast mode at the same time when the standby mode of the compound device is converted into the power-on mode and a TV broadcast screen is displayed on the display unit 113.

If the DVD title or the memory stick 102 is detected, whether a DVD title reproduction key signal or a memory stick read key signal is input to the controller 111 is checked in action 207. In action 208, the controller 111 converts the standby mode of the compound device into the power-on mode and at the same time, displays a screen of reproduced data stored in the DVD title or the memory stick 102, in action 208.

If the DVD title or the memory stick 102 is not detected in action 202, and a user desires to reproduce the data stored in the DVD title or the memory stick 102, the user inserts a desired DVD title or the memory stick 102 into the compound device, in action 209.

In action 210, the controller 111 converts the standby mode of the compound device into the power-on mode and at the same time, displays a screen of reproducing the data stored in the DVD title or the memory stick 102, in action 210.

When the power state of the compound device indicates that the compound device is powered on, the controller 111 assumes display of one of a TV broadcast mode of displaying TV broadcast signals, a video mode of displaying video signals, a DTV broadcast mode of displaying DTV signals, a PC mode of displaying PC signals, a DVI mode of displaying DVI signals, a DVD mode of displaying signals output from the DVD ROM 101, and a memory stick mode of displaying signals output from the memory stick 102.

In action 211, it is checked whether the channel up/down key signal (or user input signal) is input to the controller 111 of the compound device that operates in an operation mode. In action 212, an operation mode of the compound device is converted into the TV broadcast mode regardless of a present operation mode and a TV screen is displayed. For instance, if a present operation of the compound device is the video mode of displaying video signals and the channel up/down key signal is input to the controller 111, the controller 111 converts the present operation mode of the compound device into the TV broadcast mode and displays a TV screen.

In action 213, it is checked whether a DVD title or memory stick reproduction key is input to the controller 111 that operates in a predetermined operation mode. In action 214, the controller 111 converts the present operation mode of the compound device into a reproduction mode of reproducing the data from the DVD title or the memory stick 102 regardless of the present operation mode and displays a screen of reproducing the data from the DVD title or the memory stick. For instance, if the compound device is in the TV broadcast mode of displaying TV broadcast signals and the reproduction key of reproducing the data from the DVD title or the memory stick 102, the controller 111 converts the present operation mode of the compound device into a reproduction mode of reproducing the data from the DVD title or the memory stick 102 and displays a screen of reproducing the data from the DVD title or the memory stick 102.

As described above, a multi-function image display compound device according to the described embodiment of the present invention is easily operated with a minimum of user interfaces and further has a simple and aesthetic design.

Although an embodiment of the present invention has been shown and described, the present invention is not limited to the described embodiment. Instead, it would be appreciated by those skilled in the art that changes may be made in the embodiment without departing from the principles and spirit of the invention, the scope of which is defined by the claims and their equivalents.

What is claimed is:

1. A television (TV) apparatus comprising:
   a display unit;
   a power-state detector configured to detect a power state of the TV apparatus; and
   a controller configured to automatically change an operation mode of the TV apparatus from a TV broadcast mode to a movable memory reproduction mode in response to a detection of a movable memory connected to the TV apparatus, the detected power state of the TV apparatus, and a receiving of a user input signal corresponding to a reproduction key.

2. The apparatus of claim 1,
   wherein the controller is configured to determine a present operation mode of the TV apparatus.

3. The apparatus of claim 1, wherein the controller changes the operation mode of the TV apparatus to one of the movable memory reproduction mode regardless of the present operation mode of the TV apparatus, when the power state indicates that the TV apparatus is powered on and that the TV apparatus is operating in a predetermined operation mode and the reproduction key is input to the controller.

4. The apparatus of claim 1, wherein the TV apparatus is configured to reproduce an external video signal, a TV broadcast signal, a personal computer (PC) signal, and a signal stored in the movable memory, input to the TV apparatus, that is detected by the TV apparatus.

5. The apparatus of claim 4, further comprising a video signal processor which processes at least one of the external video signal, the TV broadcast signal, the personal computer (PC) signal, and the stored signal in the movable memory.

6. The apparatus of claim 4, wherein the controller changes the operation mode of the TV apparatus to the movable memory reproduction mode when a power state of the TV apparatus indicates that the TV apparatus is in a standby mode and the movable memory is detected by the TV apparatus.

7. The apparatus of claim 4, wherein the controller changes the operation mode of the TV apparatus to the TV broadcast mode when a channel conversion key is input, even when the movable memory is detected by the TV apparatus.

8. The apparatus of claim 7, wherein the controller changes the operation mode of the TV apparatus to the TV broadcast mode regardless of the present operation mode of the controller, when the power state indicates that the TV apparatus is powered on and operating in a predetermined operation mode, and the channel conversion key signal is input to the controller.

9. The apparatus of claim 4, wherein the movable memory is a universal serial bus (USB) memory.

10. The apparatus of claim 1, further comprising a first signal processor which removes noise in a decoded video signal and a digital television signal, the signals being received from one of a video signal processor, a digital television analog data converter, and an MPEG decoder, and signals from the movable memory, optimizes a color of the video signal, deinterlaces an interlacing broadcast signal, and outputs a processed video signal.

11. The apparatus of claim 10, further comprising a second signal processor which receives the processed video signal, scales the processed video signal for display, and outputs a scaled video signal to the display unit.

12. The apparatus of claim 11, further comprising a second transfer protocol implementer which transmits the scaled video signal to the display unit.

13. The apparatus of claim 12, wherein the second transfer protocol implementer uses a low-voltage differential signal (LVDS) transfer method.

14. The apparatus of claim 1, further comprising a transfer protocol implementer which receives a digital video interface signal from a digital video interface and outputs the digital video interface signal to a signal processor.

15. The apparatus of claim 14, wherein the transfer protocol implementer uses a transition minimized differential signal (TMDS) method to receive the digital video interface signal.

16. The apparatus of claim 1, further comprising a signal processor which, under a control of the controller, processes a caption signal and a picture-in-picture (PIP) signal for display thereof.

17. The apparatus of claim 1, further comprising an audio processor which extracts audio signals from a received TV broadcast signal, a video signal transmitted, a DTV signal, a PC signal, a DVI signal, and a signal output from the movable memory.

18. The apparatus of claim 17, further comprising an amplifier which amplifies at least one of an audio-processed woofer signal, a sound signal, and a headphone signal.

19. A television (TV) apparatus comprising:
a display unit; and
a controller configured to automatically change an operation mode of the TV apparatus from a TV broadcast mode to a movable memory reproduction mode in response to a detection of a movable memory connected to the TV apparatus and a receiving of a user input signal corresponding to a reproduction key, wherein the controller changes the operation mode of the TV apparatus to the movable memory reproduction mode when a power state of the TV apparatus indicates that the TV apparatus is in a standby mode and the movable memory is detected by the TV apparatus.

20. A television (TV) apparatus comprising:
a display unit; and
a controller configured to automatically change an operation mode of the TV apparatus from a TV broadcast mode to a movable memory reproduction mode in response to a detection of a movable memory connected to the TV apparatus and a receiving of a user input signal corresponding to a reproduction key,
wherein the controller changes the operation mode of the TV apparatus to the TV broadcast mode when a channel conversion key is input, even when the movable memory is detected by the TV apparatus.

21. The apparatus of claim 20, wherein the controller changes the operation mode of the TV apparatus to the TV broadcast mode regardless of the present operation mode of the controller, when the power state indicates that the TV apparatus is powered on and operating in a predetermined operation mode, and the channel conversion key signal is input to the controller.

22. The apparatus of claim 1, wherein the movable memory is a universal serial bus (USB) memory.

23. An operation-mode conversion method of a television (TV), the operation-mode conversion method comprising:
checking a power state of the TV;
determining a present operation mode of the TV; and
selectively converting the operation mode of the TV based on the power state and the present operation mode, and based on the power state and a detection of a movable memory by the TV, in response to a user input signal, regardless of the present operation mode.

24. The method of claim 23, wherein the converting comprises converting the present operation mode of the TV into a movable memory reproduction mode when the power state indicates that the TV is in a standby mode, the movable memory is detected from the TV, and a reproduction key signal is input to an operation-mode controller performing the operation-mode conversion method.

25. The method of claim 23, wherein the converting comprises converting the present operation of the TV into a TV broadcast mode when a channel conversion key signal is input to an operation-mode controller performing the operation-mode conversion method, even when the power state indicates that the TV is in a standby mademode and the movable memory is detected from the TV.

26. The method of claim 23, wherein the converting comprises converting the present operation of the TV into a movable memory reproduction mode when the power state indicates that the TV is in a standby mode and the movable memory is detected by the TV.

27. The method of claim 23, wherein the converting comprises converting the present operation mode of the TV into a TV broadcast mode regardless of the present operation mode, when the TV is powered on and operating in a predetermined operation mode and a channel conversion key is input to an operation-mode controller performing the operation-mode conversion method.

28. The method of claim 23, wherein the converting comprises converting the present operation mode of the TV into an movable memory reproduction mode regardless of the present operation mode, when the TV is powered on and operating in a predetermined mode and a reproduction key is input to an operation-mode controller performing the operation-mode conversion method.

29. The method of claim 23, wherein the TV enables to reproduce an external video signal, a TV broadcast signal, a personal computer (PC) signal, and a signal stored in the movable memory that is detected by the TV.

30. The method of claim 23, wherein the movable memory is a universal serial bus (USB) memory.

* * * * *

UNITED STATES PATENT AND TRADEMARK OFFICE
CERTIFICATE OF CORRECTION

PATENT NO. : 8,824,874 B2
APPLICATION NO. : 12/805891
DATED : September 2, 2014
INVENTOR(S) : Eun-Sup Kim Page 1 of 1

It is certified that error appears in the above-identified patent and that said Letters Patent is hereby corrected as shown below:

In the Claims

Column 10, Line 18, In Claim 25, Delete "mademode" and insert -- mode --, therefor.

Signed and Sealed this
Eighteenth Day of November, 2014

Michelle K. Lee
*Deputy Director of the United States Patent and Trademark Office*